N. MAXFIELD.
LAMP TURNING MECHANISM.
APPLICATION FILED DEC. 5, 1912.

1,087,501.

Patented Feb. 17, 1914.

UNITED STATES PATENT OFFICE.

NELSON MAXFIELD, OF MALONE, TEXAS.

LAMP-TURNING MECHANISM.

1,087,501.  Specification of Letters Patent.  Patented Feb. 17, 1914.

Application filed December 5, 1912. Serial No. 735,050.

*To all whom it may concern:*

Be it known that I, NELSON MAXFIELD, citizen of the United States, residing at Malone, in the county of Hill and State of Texas, have invented certain new and useful Improvements in Lamp-Turning Mechanisms, of which the following is a specification.

My invention relates to new and improved mechanism for angularly adjusting one of the lamps of an automobile, said mechanism being adapted to be operated from the driver's seat. Thus the driver of an automobile is enabled from his seat to direct one of the forward lamps in any direction within a certain arc so that the lamp may be caused to follow the curve of the road or to illuminate any object at the side of the road or street as desired.

I have illustrated an exemplification of my invention in the accompanying drawing, in which—

Figure 1:
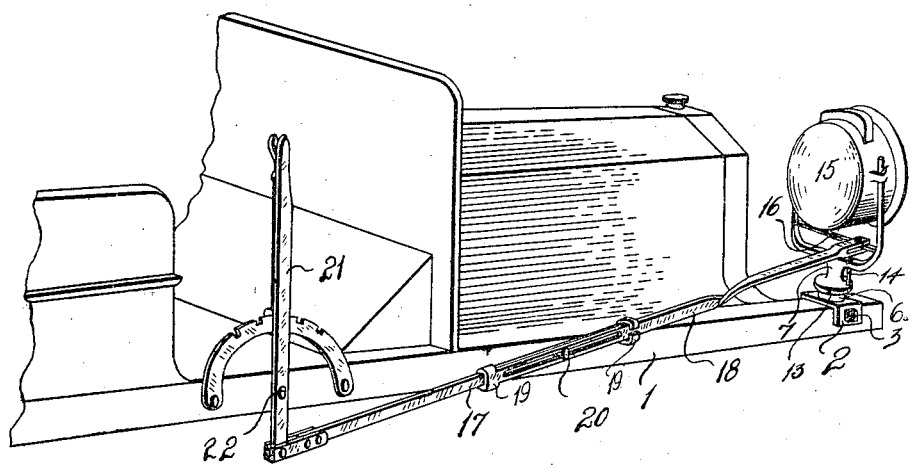
Figure 2:
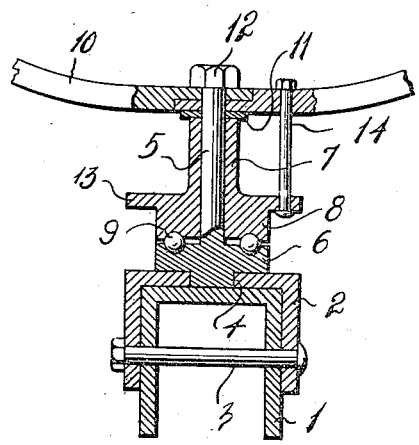

Figure 1 is a perspective view of the invention applied to the correlated parts of an automobile. Fig. 2 is a transverse section of the lamp mounting.

Referring more particularly to the drawing, reference character 1 designates the chassis rail of any standard automobile, on which, in the present instance, one of the forward lamps is mounted. An angular bracket member 2 is fixed on the chassis rail 1 by the bolt and nut 3 or in any desired manner. The bracket member 2 is provided with a centrally-disposed aperture 4, in which is mounted a vertical bearing post 5. The post 5 is provided with a circular base 6 adjacent the bracket 2. A sleeve 7, provided with a lower radial extension 8, is rotatably mounted on the post 5. The presenting faces of the parts 6 and 8 are provided with corresponding ball races carrying a suitable number of balls 9 forming a ball bearing for the rotatable sleeve 7. A lamp bracket 10 is mounted on the post 5 above the sleeve 7. The bracket 10 is preferably formed in two parts, for convenience in assembling, the meeting ends of which are correspondingly countersunk to form a smooth joint and provided with apertures for the reception of the post 5, as clearly shown in Fig. 2. I preferably provide a washer 11 between the bracket 10 and the sleeve 7 and a retaining nut 12 is screwed onto the upper threaded end of the post 5. The extension 8 is provided with a radial flange 13 and the lamp bracket 10 is fixed to rotate with the sleeve 7 by a bolt and nut 14 mounted in corresponding apertures in the flange 13 and bracket 10. The lamp 15 is mounted on the arms of the bracket 10 in any convenient manner.

I have shown a mechanism for rotating the lamp from the driver's seat on the swivel mounting just described. The bracket 10 has fixed to the arms thereof a rigid longitudinal cross-piece 16. An extensible lever arm comprising the two members 17, 18 is secured to the cross piece at one side thereof. The meeting ends of the members 17, 18 are telescoped together, the ends being bent at 19 to respectively grip the adjacent arm and the telescoping portions being correspondingly slotted. By means of a bolt and nut 20 passing through the slots the length of the lever arm may be adjusted to accord with the particular car to which the device is affixed. A hand lever 21 is pivotally secured to the free end of the member 17 and is fulcrumed at 22 on the chassis rail 1. The lever 21 is provided with the usual quadrant and hand-operated dog for retaining the lever in the desired adjusted position. It is obvious that when the lever 21 is thrown forwardly or rearwardly of its middle position the lamp is swung to the right or left respectively, the degree of deflection depending on the angular displacement of the lever.

For automobile use I prefer to equip one lamp only with my turning mechanism. Thus in turning a curve on a country road one lamp will remain straight ahead and the other lamp is turned to follow the curve of the road as the car turns, or, on a straight road, to pick out any object at the side of the road. Also, for city use, in passing along a straight street, one lamp remains straight ahead to accord with the city regulations and the rotatable lamp may be turned at will by the driver to pick out street numbers, house numbers, etc.

What I claim is:

In a device of the character described, the combination with an automobile frame, a lever pivoted on the frame, and a lever arm extending forward from the lever, of a bracket straddling the frame, a base fixed on the bracket, an integral post rising from the base, the base having an annular ball race concentric to the post, a sleeve member rotatable on the post, an integral cylindrical extension at the bottom of the sleeve having an annular ball race opposed to the ball race of the base, ball bearings disposed in the races between the sleeve extension and the base, the post projecting above the sleeve, a lamp bracket mounted loosely on the post and resting on the sleeve, means for confining the lamp bracket on the post, a rigid connection extending from the sleeve extension to the lamp bracket, and a bar fixed in the lamp bracket and to which the forward end of the lever arm is pivoted.

In testimony whereof I have signed my name to this specification in the presence of two subscribing witnesses.

NELSON MAXFIELD.

Witnesses:
J. S. MURRAY,
D. C. RAMSEY.